(12) United States Patent
Kim et al.

(10) Patent No.: US 8,252,480 B2
(45) Date of Patent: Aug. 28, 2012

(54) GASKET FOR REDUCING STRESS CONCENTRATION IN FUEL CELL STACK

(75) Inventors: Sae Hoon Kim, Gyeonggi-do (KR); Yoo Chang Yang, Gyeonggi-do (KR); Sang Mun Chin, Gyeonggi-do (KR); Jong Hyun Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1025 days.

(21) Appl. No.: 12/006,366

(22) Filed: Dec. 31, 2007

(65) Prior Publication Data
US 2009/0072496 A1    Mar. 19, 2009

(30) Foreign Application Priority Data
Sep. 14, 2007  (KR) .................... 10-2007-0093803

(51) Int. Cl.
*H01M 2/14*  (2006.01)
(52) U.S. Cl. ......... 429/507; 429/508; 429/512; 277/650
(58) Field of Classification Search .............. 429/507, 429/508, 511, 452, 458, 512, 513; 277/637, 277/650
See application file for complete search history.

(56) References Cited

U.S. PATENT DOCUMENTS

| 6,231,053 | B1 * | 5/2001 | Wakamatsu | 277/628 |
| 7,063,911 | B1 * | 6/2006 | Nagai et al. | 429/435 |
| 2004/0247981 | A1 | 12/2004 | Cummins et al. | |
| 2007/0003821 | A1 | 1/2007 | Belchuk | |
| 2007/0134536 | A1 * | 6/2007 | Takase et al. | 429/35 |

FOREIGN PATENT DOCUMENTS

| JP | 10-092450 | 4/1998 |
| KR | 10-2002-0074046 A | 9/2002 |

* cited by examiner

*Primary Examiner* — Raymond Alejandro
(74) *Attorney, Agent, or Firm* — Edwards Wildman Palmer LLP; Peter F. Corless (57) ABSTRACT

Disclosed is a gasket for reducing stress concentration in a fuel cell stack, which prevents damage or deformation of a separator and further prevents a position shift of the gasket by reducing stress concentration formed at a specific region by deformation of the gasket due to a compression force. In particular, the gasket includes a T-shaped or cross-shaped gasket joint to form hydrogen, air and coolant manifolds, and the gasket joint has a structure in which two joint branches forming an angle of 180° in the opposite direction to each other are joined at one point with a particular angles which reduce stress concentration formed due to compression force by deformation of the gasket.

10 Claims, 7 Drawing Sheets

PRIOR ART

FIG. 3
PRIOR ART $\alpha = 5° \sim 65°$

PRIOR ART

GASKET FOR REDUCING STRESS CONCENTRATION IN FUEL CELL STACK

CROSS-REFERENCE TO RELATED APPLICATION

This application claims under 35 U.S.C. §119(a) on Korean Patent Application No. 10-2007-0093803, filed on Sep. 14, 2007, the entire contents of which are incorporated herein by reference.

BACKGROUND (a) Technical Field

The present invention relates to a gasket for reducing stress concentration in a fuel cell stack. More particularly, the present invention relates to a gasket for reducing stress concentration in a fuel cell stack, which prevents damage or deformation of a separator and further prevents a position shift of the gasket.

(b) Background Art

A fuel cell system is an electricity generation system that converts chemical energy of fuel directly into electric energy. The fuel cell system generally comprises a fuel cell stack for generating electricity, a fuel supply system for supplying fuel (hydrogen) to the fuel cell stack, an air supply system for supplying oxygen in air, which is an oxidizing agent required for en electrochemical reaction, to the fuel cell stack, and a heat and water management system for removing reaction heat of the fuel cell stack to the outside of the fuel cell system and controlling the operation temperature of the fuel cell stack.

The fuel cell system having the above configuration generates electricity by the electrochemical reaction of hydrogen as a fuel and oxygen in the air and exhausts heat and water as the reaction by-products.

The fuel cell stack most widely used for a vehicle is a proton exchange membrane fuel cell (PEMFC) having a high output density.

Figure 1:
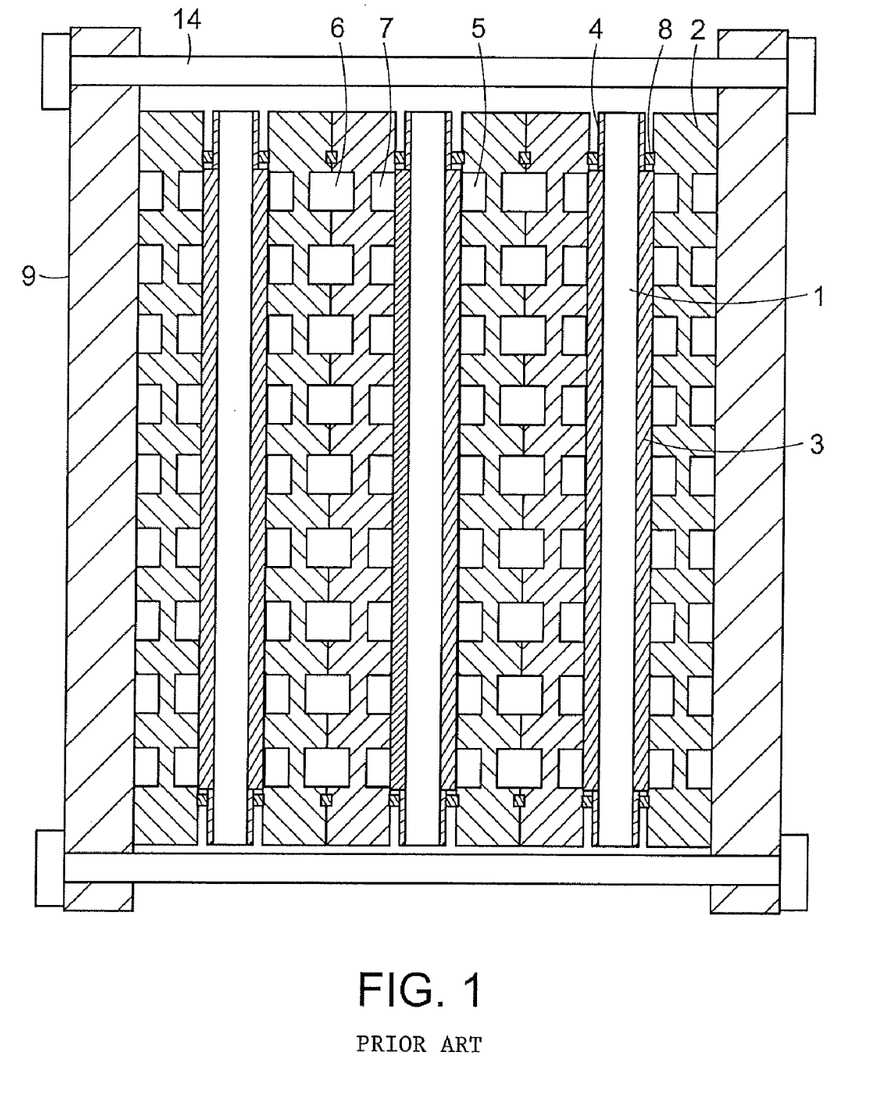
FIG. 1 is a diagram showing the structure of a conventional fuel cell stack.

FIG. 1 is a schematic diagram showing the structure of a conventional fuel cell stack structure, in which a 3-layer membrane electrode assembly (MEA) 1 including an electrolyte membrane transporting hydrogen ions and electrode/catalyst layers, in which electrochemical reaction take place, formed on both sides of the electrolyte membrane, a separator 2 formed on both surfaces of the MEA 1 to form a flow field for working gases and a coolant passage and support the fuel cell, and a gas diffusion layer (GDL) 3 disposed between the MEA 1 and the separator 2 to uniformly diffuse the working gases and transmit generated electricity are repeatedly stacked.

Recently, a support film or a carrier sheet 4 is attached on both surfaces of the MEA 1, except for the catalyst layer, and integrally formed with the MEA 1 to protect the MEA 1 and facilitate the handling of the MEA 1.

In this case, it is necessary to maintain the airtightness between the separator 2 and the MEA 1 to prevent hydrogen and air from leaking to the outside and also prevent fluid leakage between a hydrogen manifold, an air manifold, and a coolant manifold provided in the separator 2.

A gasket 8 is provided to perform such a function of maintaining the airtightness. In general, the gasket 8 is formed of fluorine-based or silicon-based polymer having a Shore A hardness of 50 by injection molding and inserted between the separators 2 or between the separator 2 and the MEA 1. Then, the airtightness is maintained by applying pressure using a connection plate 9 and a connection bolt 14.

When the external connection device is provided and the compression pressure (force) is applied after the fuel cells are stacked, the gasket is deformed to maintain the airtightness.

However, if the deformation amount of the gasket is concentrated in a spot region, the stress concentration is applied to the separator 2 and, in case of a graphite or carbon composite separator having a relatively low elasticity, it may be damaged.

Moreover, in case of a metal separator formed by a sheet metal forming process, there is no damage; however, since the flatness of the separator is not maintained, it is difficult to maintain the airtightness and further the gasket may be shifted from a reference position.

Especially, in case of a fuel cell stack which operates at high pressure, the gasket may be slipped out of the outside of the separator. A groove may be formed on the gasket to prevent the position shift; however, it is also difficult to prevent the separator from being damaged due to the stress concentration.

Meanwhile, a method of manufacturing an MEA integrated with a gasket by forming a hole around the MEA and injecting a liquid rubber material, a method of manufacturing a separator integrated with a gasket by forming a hole around the separator and injecting a liquid rubber material, and the like have been studied. Moreover, a method of forming a hole on a separate carrier sheet and integrating a gasket with both sides of the carrier sheet has been developed. In case of the metal separator, a method of preventing the gasket from being pushed out by forming a bent end part on the edge of the separator, a method of regulating the deformation amount of the gasket by inserting a spacer into the gasket, and a method of integrating the separator, the gasket and the MEA using metal clip members have been disclosed.

For example, U.S. Pat. No. 7,087,339 discloses a fuel cell membrane electrode assembly with sealing surfaces in which a thin rubber plate having a honey-comb structure is adhered to a carrier sheet having a high hardness and integrated with an MEA. Although the '339 patent has advantages in that it is possible to maintain the interval of the separator constant and reduce the assembly tolerance of the fuel cell stack after compression, it requires a large area of the gasket to maintain the airtightness. In case of a separator for a vehicle, it is necessary to increase the output density by maximizing the reaction area in the separator to facilitate the package in the vehicle. Since a gasket having a large area increases the ratio of non-reactive area in the separator, and thus increases the volume of the fuel cell stack, it is not suitable for the intended use.

U.S. Pat. No. 6,231,053 discloses a gasket for fuel cells including a gasket body composed of a metal or resin sheet and having openings and a sealing section formed by injecting a liquid rubber material, in which the sealing section is bonded to both sides of the gasket body. The liquid rubber gasket is formed integrally with an MEA, the sealing section is formed by injecting a liquid rubber material, and the gasket body has openings through which the sealing section is bonded to both sides of the gasket body, thus preventing the gasket from being pushed out by an internal pressure or compression stress concentration. However, although such a structure can effectively prevent the gasket from being pushed out by the internal pressure, if the airtightness is not maintained, hydrogen may be mixed with oxygen to degrade the catalyst layer, thus causing a dangerous situation.

Japanese Patent Application Publication No. 2004-207074 discloses a fuel cell in which a plurality of sealing members are formed by injection molding and a plurality of bent end parts are formed on the edge of a plurality of metal separators to prevent the gasket from being pushed out. In addition, a plurality of spacers are provided at the bent end parts of the plurality of metal separators to regulate the deformation amount of the sealing members or the metal separators. However, such a structure has a drawback in that, since the spacers are added to the outside of the plurality of sealing members, the area of the separator is increased. Moreover, it is expected that it is difficult to stamp the bend end parts on the metal separators and the overall structure is complicated. Furthermore, in the case where hydrogen, oxygen and coolant manifolds are formed in the metal separators, it is difficult to apply such a structure to the small interval between the manifolds.

U.S. Pat. No. 7,063,911 discloses a gasket for a fuel cell and a method of manufacturing the same, in which a connection hole is formed on a separator to connect a gasket to both sides of the separator. A groove portion is formed on the separator to prevent a position shift of the gasket. According to this method, it is possible to prevent hydrogen from being mixed with oxygen; however, it is impossible to apply the gasket to a metal separator formed by a sheet metal forming process.

Japanese Patent Application Publication No. 2004-241208 discloses a fuel cell in which a liquid rubber material is integrated with metal separators by injection molding and a plurality of metal clip members are alternately inserted therein and fixed. However, in the case where hydrogen, oxygen and coolant manifolds are formed in the metal separators, it is also difficult to apply such a structure to the small interval between the manifolds the same as the '074 publication.

U.S. Patent Application Publication No. 2006/0236535 discloses a method of forming a gasket assembly for a PEM fuel cell assembly in which a carrier sheet is die-cut to have a size and shape matching that of a PEM bipolar plate, a plurality of holes are punched in the carrier sheet, a liquid rubber gasket is formed by injection molding, and an MEA is joined to the carrier sheet by laser welding. In addition, a plastic carrier element having a flange portion is attached to the carrier sheet and a spacer is inserted into the carrier element in the vertical direction to restrict the deformation amount. However, this 535 publication is similar to the '053 patent related to the method of manufacturing an MEA integrated with a gasket assembly and the support element is about the same as the third reference except that the gasket is integrated with the MEA, not with the separator.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made in an effort to solve the above-described drawbacks, and one object of the present invention is to provide a gasket for use in a fuel cell stack, which prevents damage or deformation of a separator and further prevents a position shift of the gasket by reducing stress concentration formed at a specific region by deformation of the gasket due to a compression force.

In order to accomplish the above objects, one aspect of the present invention provides a gasket for providing airtightness to a fuel cell stack, wherein the gasket comprises a T-shaped or cross-shaped joint to form hydrogen, air and coolant manifolds and the gasket joint has a structure in which two joint branches forming an angle of 180° in the opposite direction to each other are joined at one point with a predetermined angle so as to reduce stress concentration due to a compression force by deformation of the gasket.

Preferably, the gasket may be separately manufactured and inserted between a membrane electrode assembly and a separator or between separators of the fuel cell stack. Alternatively, the gasket may be formed integrally with one or both surfaces of the separator and a support film or a carrier sheet of the MEA by injection molding.

Suitably, the predetermined angle is in the range of 5° to 65°, more particularly 25° to 45°.

In a preferred embodiment, a hole for preventing stress concentration is formed at the T-shaped or cross-shaped gasket joint where the stress concentration is formed. Preferably, a burr is formed at a region of the T-shaped gasket joint forming an angle of 90° and the center of the hole is positioned between a prior stress concentration point "a" (discussed below) and a post stress concentration point "b" (discussed below).

In another preferred embodiment, a hole for preventing stress concentration is formed at a straight portion of the gasket where the stress concentration is formed. The hole has a shape of a circle, an oval, or a polygon, for example. Suitably, the gasket may comprise a projection having a width larger than that of the straight portion of the gasket to ensure the size of the hole for preventing stress concentration and formed on the straight portion.

A suitable size of the hole for preventing stress concentration according to the present invention is designed such that the minimum width of the gasket portion adjacent to the hole ranges from ¼ to ¾ of the width of the straight portion of the gasket.

Other aspects of the invention are discussed infra.

Reference numerals set forth in the Drawings includes reference to the following elements as further discussed below:

| | |
|---|---|
| 1: MEA | 2: separator |
| 3: gas diffusion layer (GDL) | 4: carrier sheet |
| 5: hydrogen channel | 6: coolant channel |
| 7: air channel | 8, 10, 20, 30 and 40: gaskets |
| 9: connecting plate | 11a and 11b: air manifolds |
| 12a and 12b: coolant manifolds | 13a and 13b: hydrogen manifolds |
| 14: connecting bolt | |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 2:
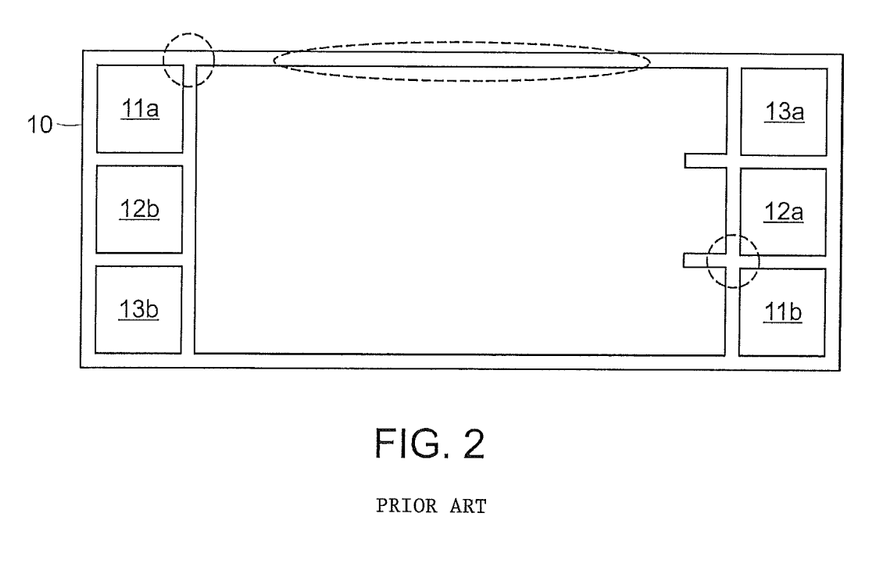
FIG. 2 is a diagram showing the structure of a conventional gasket.

FIG. 2 is a diagram showing the structure of a conventional gasket used to maintain the airtightness of a fuel cell separator.

Prior art techniques, as discussed above, integrate a gasket with a separator or with an MEA or construct an auxiliary support structure to prevent a position shift of the gasket.

Unlike the prior art techniques, the present invention aims at preventing the separator 2 from being damaged or deformed and further preventing a position shift of the gasket 10 by reducing stress concentrated at a specific region by deformation of the gasket 10 due to a compression force.

The gasket 10 for a fuel cell separator functions to prevent hydrogen, oxygen and coolant from being leaking to the outside of the separator 2 and further prevent working fluids from being mixed with each other between coolant manifolds 12a and 12b and hydrogen manifolds 13a and 13b, between coolant manifolds 12a and 12b and air manifolds 11a and 11b, and between the hydrogen manifolds 13a and 13b and the air manifolds 11a and 11b.

To perform such functions, the gasket 10 includes a T-shaped or cross-shaped joint.

Figure 3:
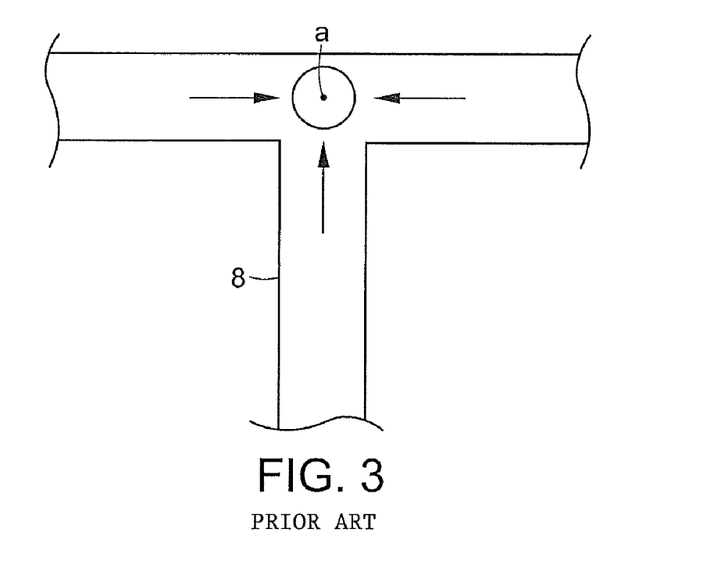
FIG. 3 is a diagram showing a conventional T-shaped gasket joint.

If the T-shaped gasket joint is applied with a compression pressure, as shown in FIG. 3, a stress concentration is formed by deformation at a joint of a gasket 8, where three branches are joined. In case of a carbon or graphite separator which is fragile, it may be damaged and, in case of a metal separator, it may be bent or the gasket may be slipped out of the separator.

Figure 4:
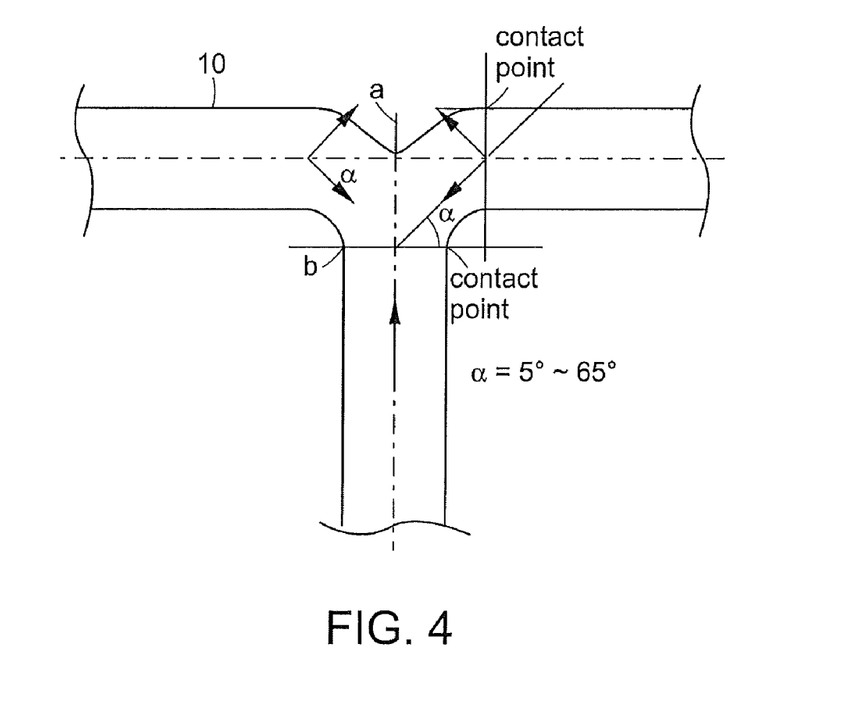
FIG. 4 is a diagram showing a gasket joint in accordance with a preferred embodiment of the present invention.

As shown in FIG. 4, as a method of preventing such a phenomenon, each of two branches forming an angle of 180° in the opposite direction to each other has a predetermined angle α to shift the stress concentration point from existing point "a" adjacent to the edge of the separator to point "b" adjacent to the inside of the separator, thus preventing the gasket 10 from being shifted to the outside of the separator and further achieving an effect of vectorially dispersing the stress concentration.

Preferably, the angle α may be in the range of 5° to 65°, more preferably, 25° to 45°. If the angle α is less than 5°, the effect of vectorially dispersing the stress is not significant. On the other hand, if the angle α exceeds 65°, since the area of dead space in the gasket which does not participate in the electrochemical reaction is increased, it is difficult to manufacture a vehicle fuel cell stack having a high output density.

Figure 5:
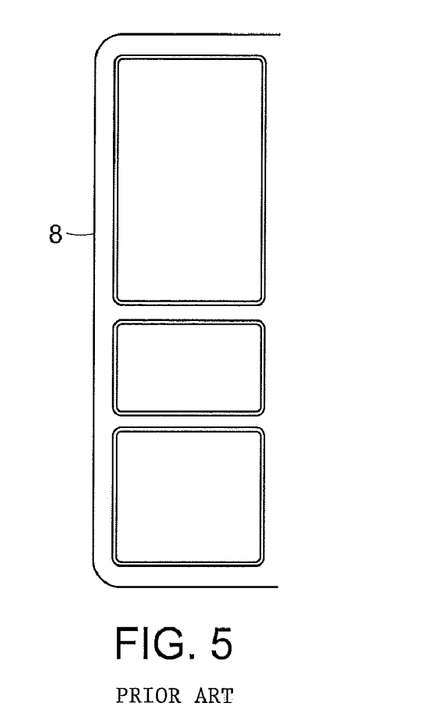
FIG. 5 is a diagram showing a portion of a conventional gasket.
Figure 6:
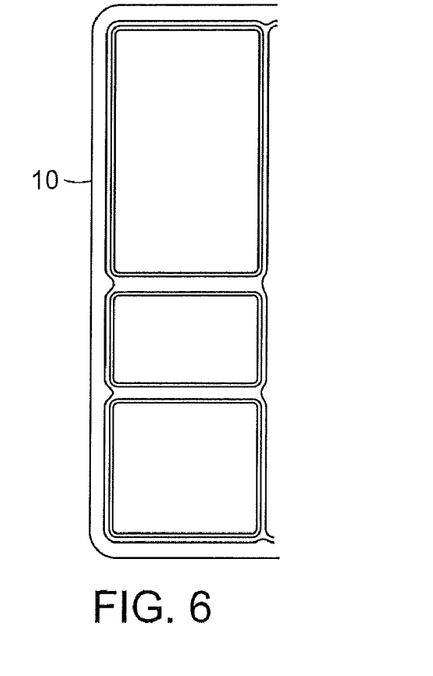
FIG. 6 is a diagram showing a portion of a gasket in accordance with a preferred embodiment of the present invention.

FIG. 5 is a diagram showing a portion of a conventional gasket, of which gasket branches form an angle of 90°, and FIG. 6 is a diagram showing a portion of a gasket in accordance with the preferred embodiment of the present invention.

In the vertical design of FIG. 5, if about one hundred separators are stacked, graphite separators may be damaged; by contrast, according to the design of FIG. 6, even if more than two hundred separators are stacked, the gasket 10 is hardly damaged or shifted.

Figure 7:
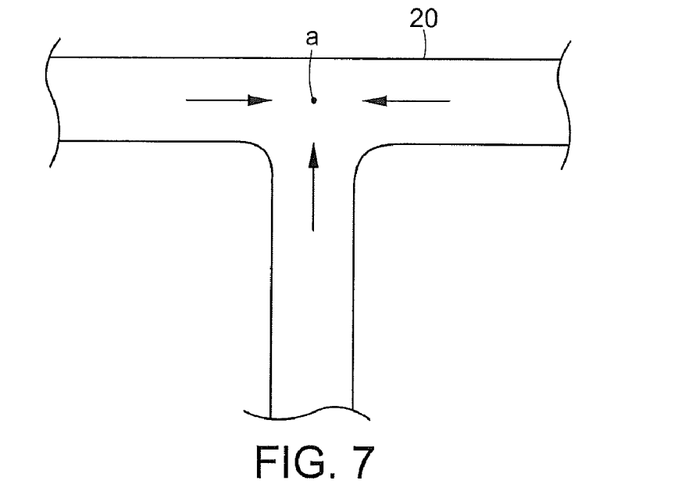
FIGS. 7 and 8 are diagrams showing gasket joints in accordance with another preferred embodiments of the present invention.
Figure 8:
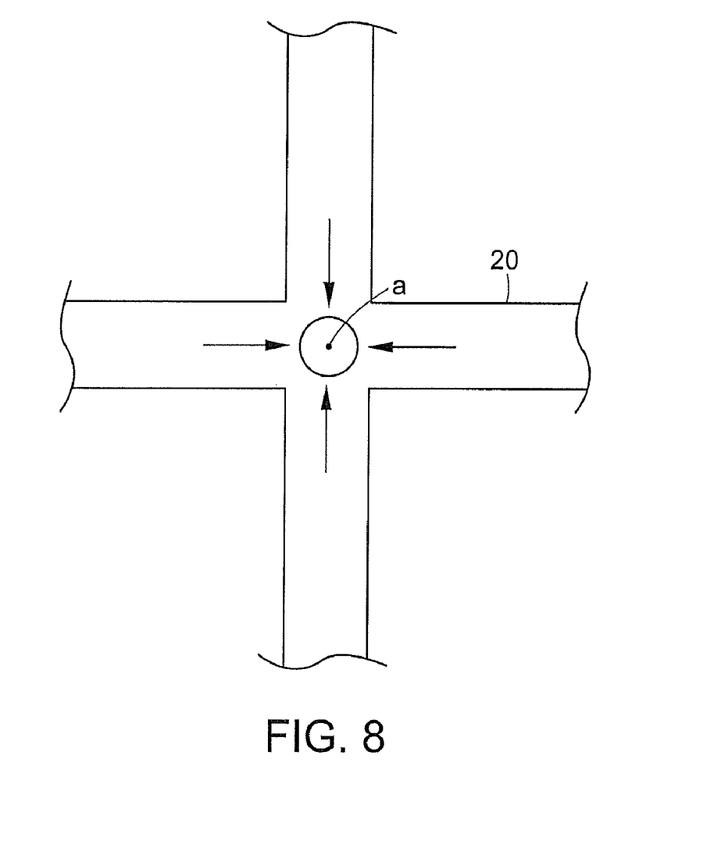

FIGS. 7 and 8 show another method of simply reducing the stress concentration during stacking, in which a hole is formed at the point where the stress is concentrated so that the deformation amount of a gasket 20 is absorbed by the empty space of the hole.

Figure 9:
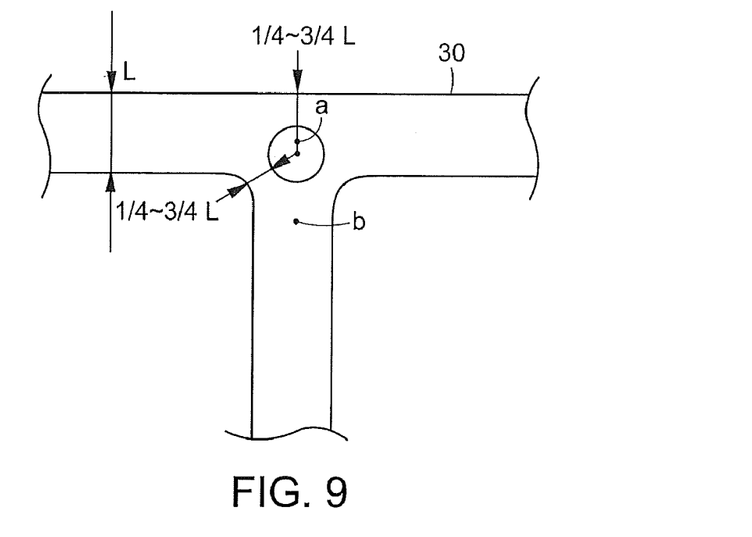
FIG. 9 is a diagram showing a gasket joint in accordance with still another embodiment of the present invention.

Although this method is simplified, it may be difficult to apply it to a gasket having a small width. In this case, as shown in FIG. 9, the region of a gasket 30 forming an angle of 90° is designed as described with reference to FIG. 4, a burr is formed inside the joint to ensure a space for forming a hole, and the center of the hole is positioned between the existing stress concentration point "a" and the changed point "b."

The gasket burr is formed at the cross-shaped gasket joint of FIG. 8 and a hole is formed at the stress concentration point "a."

Figure 10:
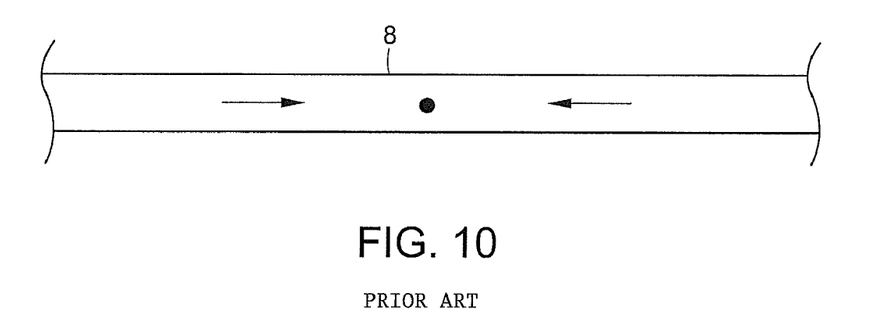
FIG. 10 is a diagram showing a conventional gasket straight portion.

Meanwhile, although there is no problem in case of a gasket having a small straight portion, in the case where the separator is long, the gasket has a long straight portion as shown in FIG. 2. In this case, as shown in FIG. 10, the stress concentration is formed at one point and thus the gasket 8 may be shifted.

Figure 11:
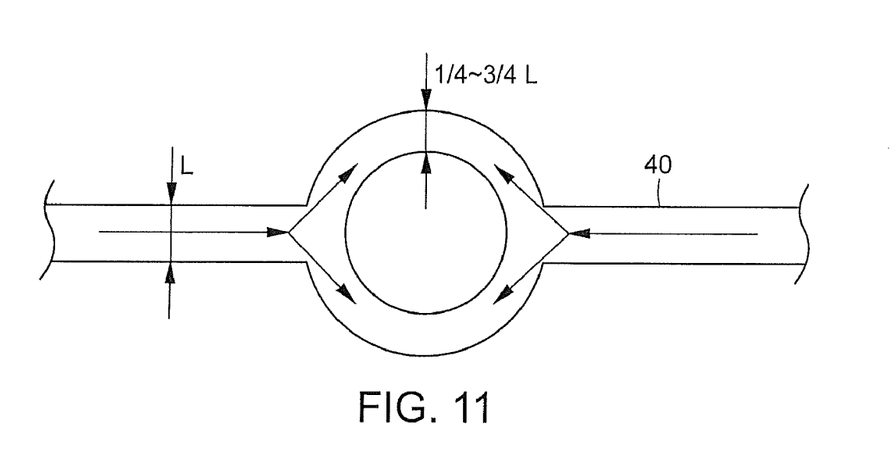
FIG. 11 is a diagram showing a gasket straight portion in accordance with a further embodiment of the present invention.

Accordingly, as shown in FIG. 11, at least one hole is formed at the straight portion of a long gasket 40 to disperse the stress, thus preventing the gasket 40 from being shifted. The shape of the gasket is not limited to a particular shape. For example, the gasket may have a shape of a circle, an oval, or a polygon.

Preferably, the gasket may comprise a projection having a width larger than that of the straight portion of the gasket to ensure the size of the hole for preventing stress concentration and formed on the straight portion.

Suitably, the size of the holes of FIGS. 7 to 9 and 11 is designed such that the minimum width of the gasket portion adjacent to the hole ranges from about ¼ to ¾ of the width of the gasket straight portion L.

Figure 12:
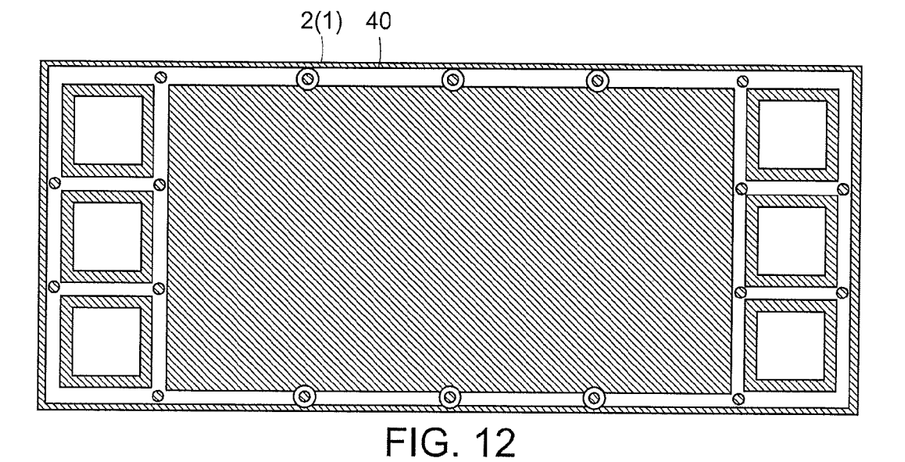
FIGS. 12 and 13 are diagrams showing gaskets to which holes for preventing stress concentration in accordance with a preferred embodiment of the present invention is applied.
Figure 13:
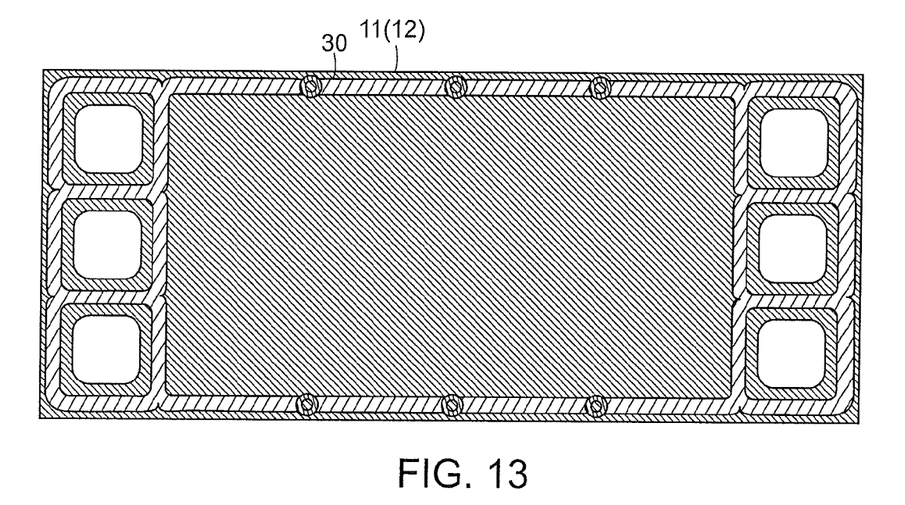

FIGS. 12 and 13 show that the gaskets 30 and 40 in accordance with the present invention are placed on the separator 2 or the MEA 1.

The gasket of the present invention may be formed of a liquid silicon-based, fluorine-based, or fluorine-silicon-based polymer and connected to a graphite or carbon composite separator or a metal separator such as stainless steel, and a carrier sheet of the MEA. It also may be integrated by injecting a liquid polymer directly to the separator or manufactured separately and adhered to the separator using an adhesive agent.

As described above, according to the gasket for reducing stress concentration in a fuel cell stack of the present invention, it is possible to prevent the separator from being damaged or deformed and further prevent the position shift of the gasket by reducing the stress concentration formed at a specific region by deformation of the gasket due to a compression force.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A gasket for reducing stress concentration in a fuel cell stack, the gasket comprising:

a T-shaped or cross-shaped joint forming hydrogen, air and coolant manifolds, wherein the joint has a structure in which two first branches are connected to form an angle of 180° in opposite directions of each other, on one second branch is formed perpendicularly to the first two branches and the first two branches and the second branch joined at one point, wherein an indentation is formed on an outer periphery where the first two branches are connected, the indentation formed at a predetermined angle, the predetermined angle calculated based upon an angle required to reduce stress concentration on the T-shaped joint due to an externally applied compression force by deformation of the gasket; and a hole disposed between an inner most point of the indentation and a stress concentration point located within the second branch, and the distance between the inner most point of the indentation and the center of the hole is ¼-¾ a width (L) of a straight portion of at least one of the first branches.

2. The gasket for a fuel cell stack of claim 1, wherein the gasket is separately manufactured and inserted between a membrane electrode assembly and a separator or between separators of the fuel cell stack.

3. The gasket for a fuel cell stack of claim 2, wherein the gasket is formed integrally with one or both surfaces of the separator and a support film or a carrier sheet of the membrane electrode assembly by injection molding.

4. The gasket for a fuel cell stack of claim 1, wherein the predetermined angle is in the range of 5° to 65°.

5. The gasket for a fuel cell stack of claim 1, wherein the predetermined angle is in the range of 25° to 45°.

6. The gasket for a fuel cell stack of claim 1, wherein the inner most point of the indentation is a prior stress concentration point "a" and the stress concentration point in the second branch is a post stress concentration point "b", and a burr is formed at a region of the T-shaped gasket joint forming an angle of 90° and the center of the hole is positioned between a prior stress concentration point "a" and a post stress concentration point "b".

7. The gasket for a fuel cell stack of claim 1, wherein a second hole for preventing stress concentration is formed within the straight portion of the gasket where the stress concentration is formed.

8. The gasket for a fuel cell stack of claim 7, wherein the second hole for preventing stress concentration formed at the straight portion of the gasket has a shape selected from the group consisting of a circle, an oval, and a polygon.

9. The gasket for a fuel cell stack of claim 8, wherein the gasket comprises a projection having a width larger than that of the straight portion of the gasket to ensure the size of the hole for preventing stress concentration and formed on the straight portion.

10. The gasket for a fuel cell stack of claim 9, wherein the size of the second hole for preventing stress concentration is designed such that the minimum width of the gasket portion adjacent to the hole ranges from ¼ to ¾ of the width of the straight portion of the gasket.

* * * * *